United States Patent
Balck et al.

(10) Patent No.: US 8,971,909 B2
(45) Date of Patent: Mar. 3, 2015

(54) METHOD AND ARRANGEMENT IN A COMMUNICATIONS SYSTEM FOR HANDLING A GBR BEARER

(75) Inventors: Kenneth Balck, Linköping (SE); Henrik André-Jönsson, Linköping (SE); Håkan Asp, Nykil (SE); Christian Axell, Mjölby (SE); Rasmus Axén, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 37 days.

(21) Appl. No.: 14/007,108

(22) PCT Filed: Mar. 31, 2011

(86) PCT No.: PCT/SE2011/050370
§ 371 (c)(1),
(2), (4) Date: Sep. 24, 2013

(87) PCT Pub. No.: WO2012/134364
PCT Pub. Date: Oct. 4, 2012

(65) Prior Publication Data
US 2014/0011510 A1  Jan. 9, 2014

(51) Int. Cl.
*H04W 72/00* (2009.01)
*H04W 76/06* (2009.01)

(52) U.S. Cl.
CPC .......... *H04W 76/066* (2013.01); *H04W 76/068* (2013.01)
USPC ..................................................... 455/452.1

(58) Field of Classification Search
CPC ..... H04W 72/12; H04W 16/10; H04W 28/08; H04W 28/16; H04W 28/085; H04W 28/0252
USPC .................................... 455/450, 452.1, 452.2
See application file for complete search history.

(56) References Cited

U.S. PATENT DOCUMENTS

| | | | |
|---|---|---|---|
| 2007/0259673 A1 | 11/2007 | Willars et al. | |
| 2010/0151837 A1* | 6/2010 | Mang et al. | 455/414.1 |
| 2012/0165013 A1* | 6/2012 | Nishida et al. | 455/452.1 |

FOREIGN PATENT DOCUMENTS

| | | |
|---|---|---|
| EP | 1672941 A1 | 6/2006 |
| EP | 2015524 A1 | 1/2009 |

OTHER PUBLICATIONS

3rd Generation Partnership Project, "3rd Generation Partnership Project; Technical Specification Group Radio Access Network; Evolved Universal Terrestrial Radio Access Network (E-UTRAN); S1 Application Protocol (S1 AP) (Release 10)", Technical Specification, 3GPP TS 36.413 V10.1.0, Mar. 1, 2011, pp. 1-256, 3GPP, France.

(Continued)

*Primary Examiner* — Marisol Figueroa
(74) *Attorney, Agent, or Firm* — Coats & Bennett, PLLC

(57) ABSTRACT

A method in a first network node for handling a GBR bearer is provided. The first network node is comprised in a communications system. The first network node allocates (202) to a user equipment, a GBR bearer for a data transmission. A first timer in the first network node is started (203), when scheduling data for the data transmission on the GBR bearer is interrupted. The first network node releases (204) the GBR bearer, when the first timer has expired, when there is a request for a bearer from a second network node, and when there are no further bearer resources available within the first radio network node.

10 Claims, 4 Drawing Sheets

(56) References Cited

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 10)", Technical Specification, 3GPP TS 23.401 V10.10.0, Mar. 1, 2013, pp. 1-279, 3GPP, France.

* cited by examiner

METHOD AND ARRANGEMENT IN A COMMUNICATIONS SYSTEM FOR HANDLING A GBR BEARER

TECHNICAL FIELD

Embodiments herein relate to a first network node and a method therein. In particular it relates to handling a Guaranteed Bit Rate (GBR) bearer.

BACKGROUND

Communication devices such as mobile stations are also known as e.g. mobile terminals, wireless terminals and/or User Equipments (UEs). Mobile stations are enabled to communicate wirelessly in a cellular communications network or wireless communication system, sometimes also referred to as a cellular radio system. The communication may be performed e.g. between two mobile stations, between a mobile station and a regular telephone and/or between a mobile station and a server via a Radio Access Network (RAN) and possibly one or more core networks, comprised within the cellular communications network.

Mobile stations may further be referred to as mobile telephones, cellular telephones, or laptops with wireless capability, just to mention some further examples. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the mobile stations within range of the base stations.

In 3rd Generation Partnership Project (3GPP) Long Term Evolution (LTE), base stations, which may be referred to as eNodeBs or even eNBs, may be directly connected to one or more core networks.

In the context of this disclosure, the expression DownLink (DL) is used for the transmission path from the base station to the mobile station. The expression UpLink (UL) is used for the transmission path in the opposite direction i.e. from the mobile station to the base station.

At traffic congestion in the radio access network the resources of a base station such as an eNB or a cell may be depleted such that no more bearers for end users such as user equipments can be set up in the base station or the cell. A user equipment wishing to access a service via the radio access network will experience a denial of the requested service. For high priority services, like emergency calls, some of the "soft" resource limits set up by the operator of the radio access network may be disregarded to still carry out the high priority service. Examples of such "soft" limits are e.g. a licensed number of connected user equipments, and a bandwidth allocated for GBR bearers. A GPR bearer is a bearer with guaranteed bit rate. A user equipment may have many simultaneous bearers, each bearer is associated with a certain Quality of Service. Services with the same quality of service share one bearer The licensed number of connected user equipments is normally not a critical limit from a physical resource point of view and can be overridden without any immediate consequences.

When a GBR bearer is allocated for a user equipment, a certain bandwidth is reserved for this bearer for the lifetime of the bearer. The total bandwidth set aside for GBR bearers represents a physical resource but this reservation can be temporarily extended to allow set up of high priority GBR bearers. Some bandwidth must however be reserved for non GBR bearers to avoid total "starvation" of such bearers if all allocated GBR bandwidth should be fully utilized at some point in time. Typically not all user equipments utilize their allocated bandwidth all the time so there will normally be plenty of bandwidth which can be used by the non-GBR bearers. However, when the reservation for GBR bearers has been extended to its limit, the only way to still admit another GBR bearer is to enforce a release of an already established bearer. This may be performed by so called pre-emption, i.e. immediate release of some active GBR bearer to make room for the new one. Another way is to apply "early release", which means that a temporarily inactive GBR bearer is released, i.e. before it is released from the application using it.

When a bearer is allocated to a user equipment, it is associated with an "Allocation and Retention Priority" value. This includes a "Pre-emption Vulnerability" bit and a "Pre-emption Capability" bit. The "Pre-emption Vulnerability" bit indicates if it is allowed to pre-empt the bearer to set up another bearer. The "Pre-emption Capability" bit indicates if it is allowed to pre-empt another bearer to set up this new bearer.

In the current 3GPP standard the base station may request the release of all bearers, i.e. all Evolved UTRAN Radio Access Bearers (E-RABs) using an S1 AP UE CONTEXT RELEASE REQUEST message sent to a Mobility Management Entity (MME). The MME is the core network node controlling the LTE access network. S1 is the name of the interface between the eNB and the EPC (Evolved Packet Core). S1 AP is the part towards the MME, comprising the control part of the S1 interface.

One reason for this request may be inactivity of an allocated bearer of a user equipment during a certain time, i.e. no data are scheduled on the bearer. This possibility is valuable when the resources in the base station, i.e. the cell resources, in terms of licensed number of connected user equipments is close to the limit. The inactivity time before a user equipment release shall be triggered is not governed by the MME and can thus be decided locally in the base station. An operator settable user equipment inactivity timer may be used for this.

In the current 3GPP standard the base station may locally release a certain radio bearer and notify the MME using the S1 AP E-RAB RELEASE INDICATION message. This option may for example be used by the base station when it detects inactivity on the bearer. The inactivity timer on user equipment level enables the release of a user equipment and all its bearers in a situation of resource shortage. As long as there is activity on some of its bearers the user equipment will remain connected. If the user equipment has unused GBR bearers, their reservation of bandwidth will remain. This prevents allocation of GBR bearers for other user equipments even if there is no GBR traffic in the cell at all. This is obviously an unsatisfactory situation even if the non used resources can be used by the non-GBR bearers.

In some markets, e.g. the US, it is not allowed to disrupt an ongoing call by pre-emption, not even for the purpose to set up an emergency call. Even if the concept of "an ongoing call" is a bit out of place in LTE, since all services are carried out in the packet domain, release of active resources must still be regarded as a forbidden action in markets not allowing pre-emption.

SUMMARY

It is therefore an object of embodiments herein to provide a way of improving performance in a communications system.

According to a first aspect of embodiments herein, the object is achieved by a method in a first network node for handling a GBR bearer. The first network node is comprised in a communications system. The first network node allocates to a user equipment, a GBR bearer for a data transmission. A first timer in the first network node is started, when scheduling data for the data transmission on the GBR bearer is interrupted. The first network node releases the GBR bearer, when the first timer has expired, when there is a request for a bearer from a second network node, and when there are no further bearer resources available within the first radio network node.

According to a second aspect of embodiments herein, the object is achieved by a first network node for handling a GBR bearer. The first network node is comprised in a communications system, the first network node comprises a first timer. The first network node further comprises an allocating unit configured to allocate to a user equipment, a GBR bearer for a data transmission. The first network node further comprises a timer control unit configured to start a first timer, when scheduling data for the data transmission on the GBR bearer is interrupted. The allocating unit further is configured to release the GBR bearer when the first timer has expired, when there is a request for a bearer from a second network node, and when there are no further bearer resources available within the first radio network node.

Since the GBR bearer is released only when the first timer has expired, when there is a request for a bearer from a second network node, and when there are no further bearer resources available within the first radio network node, the GBR bearer is only released when a bearer really is needed, i.e. when it really is necessary. This results in an improved performance in the communications system, since the accessibility of GBR bearers will increase and thus the perceived service to the end user. For example, in the US market in particular emergency calls may be set up that otherwise would have been rejected and the improvement provided by not always releasing the bearers when the first timer has expired is to reduce setup and release signaling, see further below.

An advantage with embodiments herein is that for markets where conventional preemption is not allowed, the bearer associated timer enables early release of bearers, thereby allowing high priority bearers, like those for emergency call, to be set up without any substantial delay.

A further advantage with embodiments herein is that for all markets allowing pre-emption, the timer offer a higher granularity in the priority of the bearers. Bearers with equal priority level may be further differentiated by their timer values.

A further advantage with embodiments herein is that bearers may be kept activated for a user equipment even if there is no immediate need for them.

A further advantage with embodiments herein is that the time to start the data flow when more user data shall be transferred for the same user equipment is reduced.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

Figure 1:
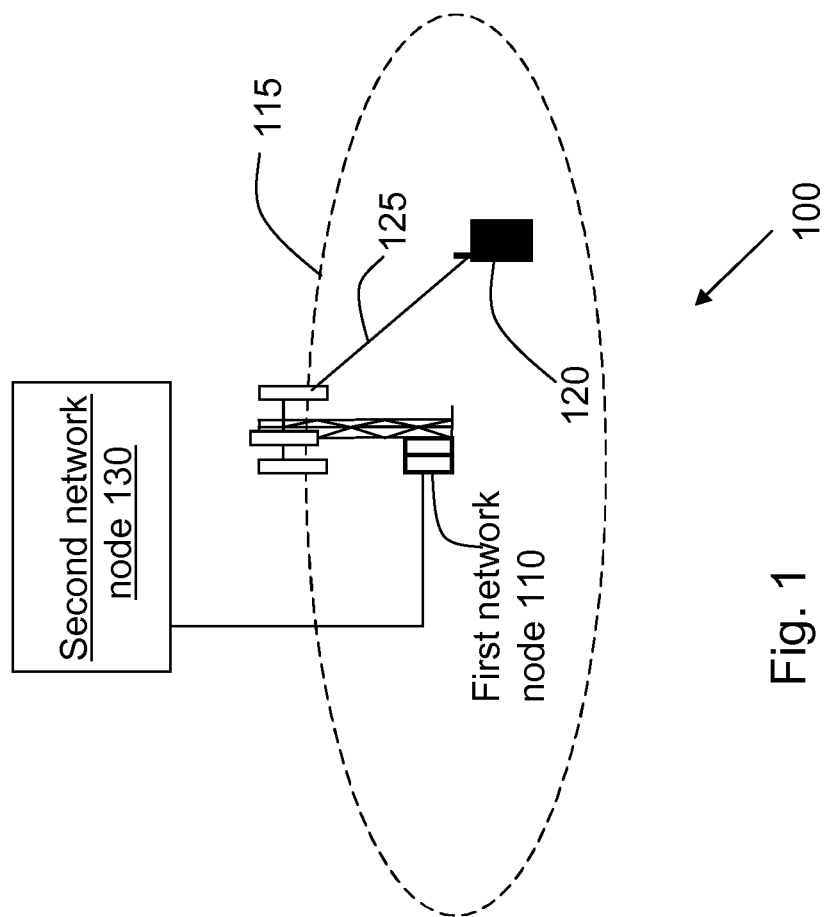
FIG. 1 is a schematic block diagram illustrating embodiments in a communications in a communications system.

FIG. 1 depicts a communications system 100 in which embodiments herein may be implemented. The communications system 100 may be a cellular communications network 100 such as an LTE, WCDMA, GSM network, any 3GPP cellular network, or any cellular network or system.

The communications system 100 comprises a first network node 110. In the example of FIG. 1, the first network node 110 is a radio base station serving a cell 115. The first network node 110 may e.g. be a radio base station such as an eNB, eNodeB, or a Home Node B, a Home eNode B, a GSM/EDGE radio base station or any other network unit capable to serve a user equipment in a cellular communications system.

A user equipment 120 is located within the cell 115. The user equipment 120 is configured to communicate within the cellular communications network 100 via the first network node 110 over a radio link 125 when the user equipment 120 is present in the cell 115 served by the base station 110. The user equipment 120 may be e.g. be a mobile terminal or a wireless terminal, a mobile phone, a computer such as e.g. a laptop, a tablet pc such as e.g. an iPad, a Personal Digital Assistant (PDA), or any other radio network unit capable to communicate over a radio link in a cellular communications system.

A number of other user equipments, not shown, may also be located within the cell 115.

The communications system 100 comprises a second network node 130. The second network node 110 may e.g. be an MME, or an eNB.

Timer Pair

Embodiments herein provides implementation of an "early release" of GBR bearers by letting a network node such as the second network node 130 assign a pair of timers when a GBR bearer is allocated to the user equipment 120 and to use these timers to decide when the GBR bearer can be considered available for allocation by other user equipments or other services. Note that this "early release" does not mean that the user equipment is released. Since non-GBR bearers do not reserve any radio bandwidth it is not considered necessary to be able to release those while a user equipment is still in connected mode.

Figure 4:
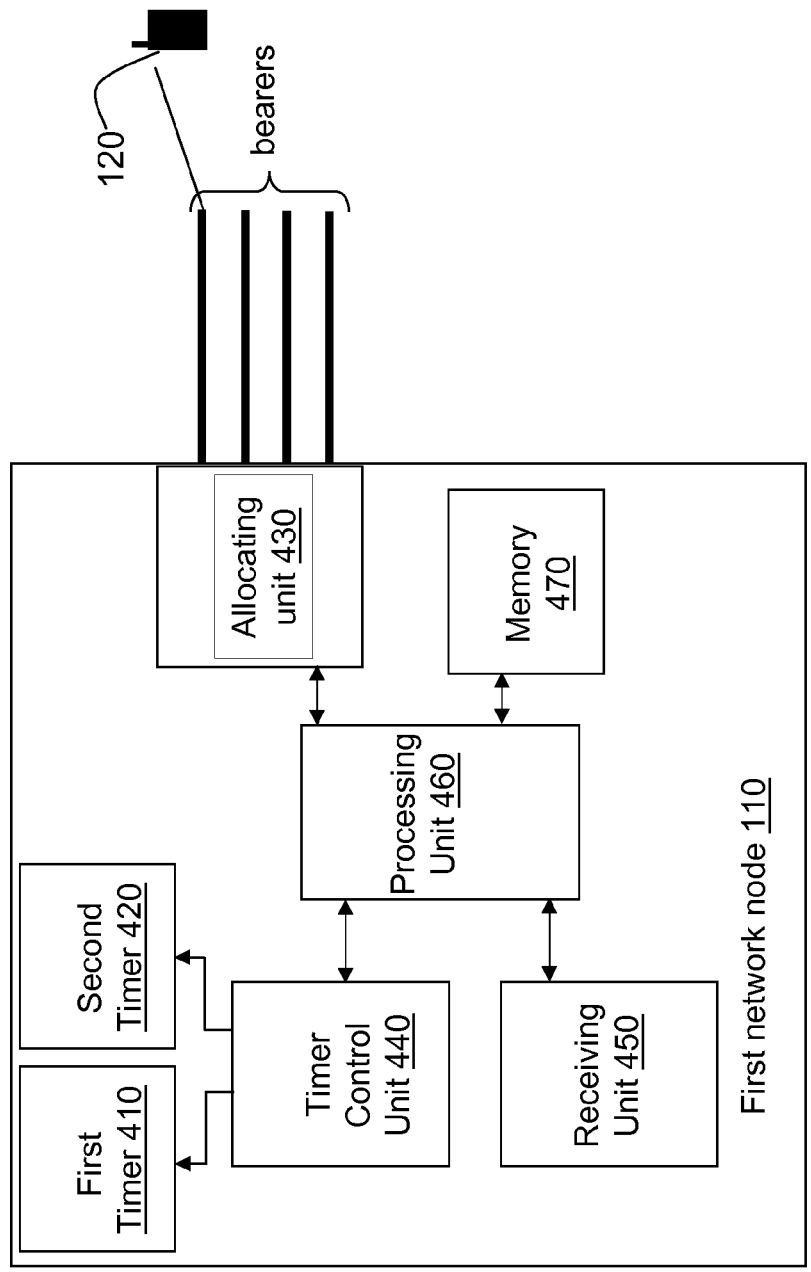
FIG. 4 is a schematic block diagram illustrating embodiments of a first network node.

The timer pair comprises a first timer 410 and a second timer 420, which are depicted in FIG. 4 and are described below in the text related to FIG. 4.

The first timer 410 and the second timer 420 may be set by the second network node 130 such as e.g. a MME. A radio access network has no or very limited insight into the services carried by the bearers so the value of the first timer 410 and the second timer 420 may e.g. be set by an MME.

The first timer 410 may be an Availability Timer (AT). The first timer 410 may decide the minimum time of non-activity before a bearer can be released for the purpose of being allocated to another user equipment or another service. The first timer 410 starts at the first occasion when no data is scheduled on the GBR bearer, i.e. when the scheduling of data for the data transmission on the GBR bearer is interrupted. When the data transmission is resumed on the GBR bearer, the first timer 410 may be is reset to its initial value. If the first timer 410 expires the first network node 110 may release the GBR bearer and its S1 resources, if there is a request for a bearer from the second network node 120. If the bearer is released the second network node 130 is notified about this. In case of LTE wherein the second network node 130 is represented by an MME, the MME may be notified by an E-RAB RELEASE INDICATION message sent from the first network node which in the case of LTE is represented by an eNB.

The second timer 420 may be a Holdover timer (HT). The second timer 420 may be started upon expiry of the first timer 410, e.g. being represented by the Availability timer. If data transmission is resumed while the second timer 420, in this example the Holdover timer is running, this second timer 420 and the first timer 410, in this example the Availability timer may be reset to their initial values. At expiry of the second timer 420, the first network node 110, in case of LTE the eNB, releases the GBR bearer and its S1 resources. The first network node 110 may notify the second network node 130 about this, for example, in embodiments using LTE, the eNB may notifies the MME by an E-RAB RELEASE INDICATION message.

Figure 2:
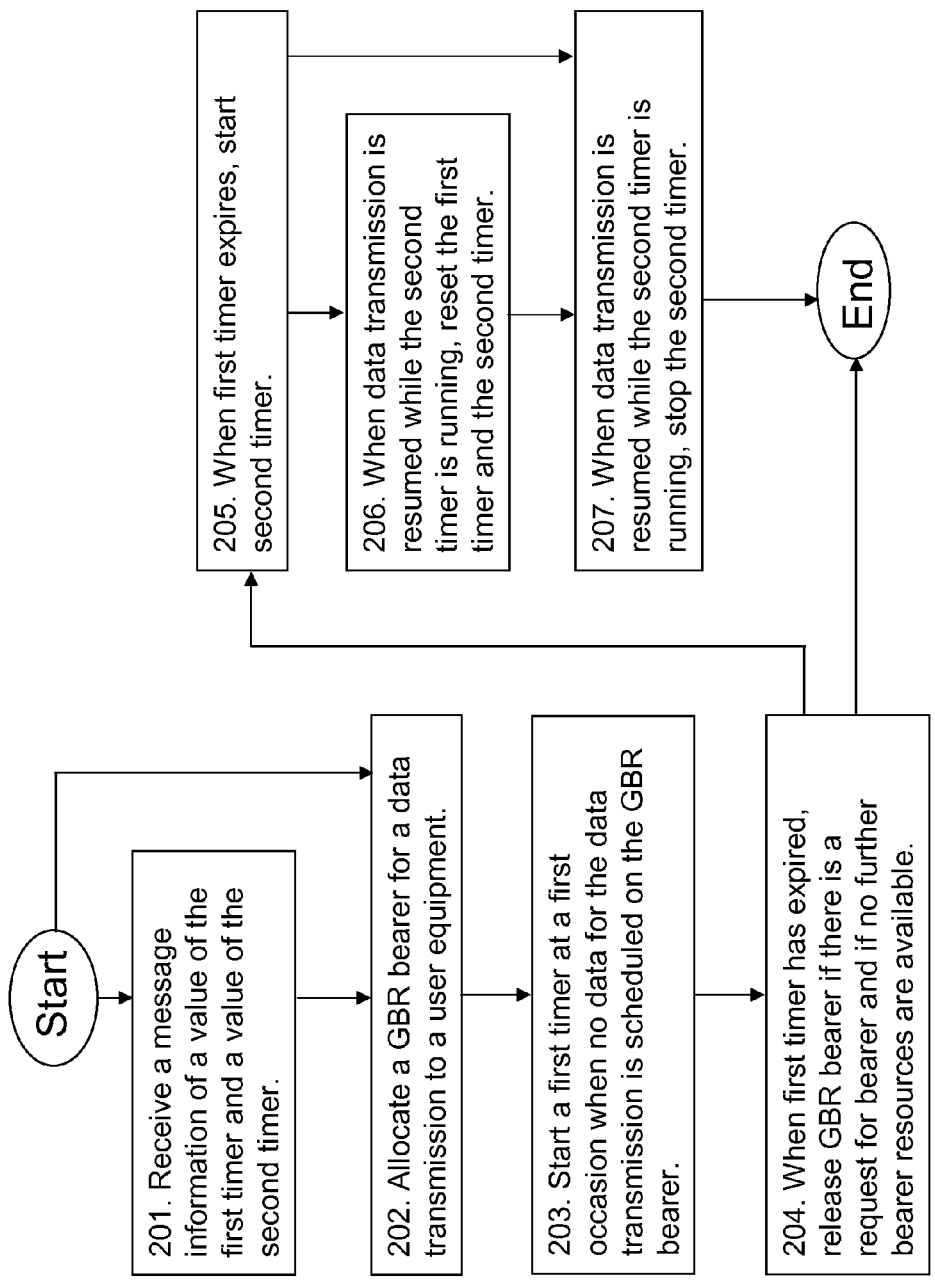
FIG. 2 is a flowchart depicting embodiments of a method in a first network node.

Embodiments of a method in the first network node 110 for handling a GBR bearer will now be described with reference to the flowchart depicted in FIG. 2. As mentioned above the first network node 110 is comprised in the communications system 100. The method comprises the following actions, which actions may as well be carried out in another suitable order than described below.

Action 201

The first network node 110 may receive a message from the second network node 130. The message comprises information about a first value of the first timer 410, which first value is the value when the first timer 410 expires. The message further comprises information about a second value of the second timer 420, which second value is the value when the second timer 420 expires. This may e.g. be performed in every bearer setup request from the second node, i.e. is part of the request message.

In some embodiments, the first timer 410 and the second timer 420 are running. In these embodiments the information of the first value further may comprises information about the remaining time until the first timer 410 expires. Further in these embodiments, the information of the second value further may comprise information about the remaining time until the second timer 420 expires.

Thus, the second network node 130 may signal the first value and the second value to the first network node 110. In some embodiments wherein the second network node 130 is an MME, the MME signals the first value and second value to the first network node 110 being a base station means that an S1 AP interface will have to be extended with this information.

In embodiments using LTE, the timer pair, i.e. the first timer 410 and the second timer 420, e.g. AT and HT, may be made part of the optional GBR Quality of Service (QoS) Information Element (IE), which is part of the IE E-RAB Level QoS Parameters. This IE is mandatory in the following S1 AP messages sent by the MME: The E-RAB SETUP REQUEST message, the E-RAB MODIFY REQUEST message, the INITIAL CONTEXT SETUP REQUEST message and the HANDOVER REQUEST message, i.e. the first timer 410 and the second timer 420 may be sent in any of these messages.

Action 202

According to an example scenario the user equipment 120 wishes to start a data transmission to the first network node 110, or the first network node 110 wishes to start a data transmission to the user equipment 120. The data may be voice, video, or any type of user data that requires a GBR bearer. To be able to perform the data transmission, the first network node 110 allocates to the user equipment 120, a GBR bearer for a data transmission.

Action 203

The first network node 110 schedules data for the data transmission on the GBR bearer. When the scheduling of data for the data transmission on the GBR bearer is interrupted, the first network node 110 starts the first timer 410. As mentioned above, the first timer 410 may decide the minimum time of non-activity before a bearer can be released for the purpose of being allocated to another user equipment or another service.

Action 204

The first network node 110 releases the GBR bearer, when the first timer 410 has expired, when there is a request for a bearer from the second network node 130, and when there are no further bearer resources available within the first radio network node 110. The advantage with this is that the GBR bearer is only released when a bearer is needed, i.e. when it really is necessary.

If the first timer 410 has expired, but there is no outstanding request for a bearer from a second network node 130, there is no need for any further bearer and therefore in this case the first network node 110 does not release the GBR bearer to the user equipment 120.

If the first timer 410 has expired, but there are further bearer resources available within the first radio network node 110, there is neither in this case any need for any further bearer and therefore also in this case the first network node 110 does not release the GBR bearer to the user equipment 120.

When the GBR bearer is released, the first network node 110 may notify the second network node 130, such as e.g. the MME, that the GBR bearer has been released.

Action 205

When the first timer 410 expires, the first network node 110 starts 205 a second timer 420. If the data transmission is resumed while only the first timer 410 is running, i.e. before it expires, the first network node 110 may reset the first timer 410. The second timer allows data, that arrive from the core network or is initiated by the user equipment, while the timer is running to be forwarded without any delay, i.e. no bearer establishment procedure has to be executed between the user equipment 120 and the core network.

Action 206

When the data transmission is resumed after the interruption of scheduling data for the data transmission on the GBR bearer while the second timer 420 is running, the first network node 110 resets the first timer 410 and the second timer 420. The bearer is thus considered active again.

Action 207

When the data transmission is resumed after the interruption of scheduling data for the data transmission on the GBR bearer while the second timer 420 is running, the first network node 110 further stops the second timer 420.

When the second timer 420 expires without the data transmission being resumed, the first network node 110 may release the GBR bearer.

Figure 3:
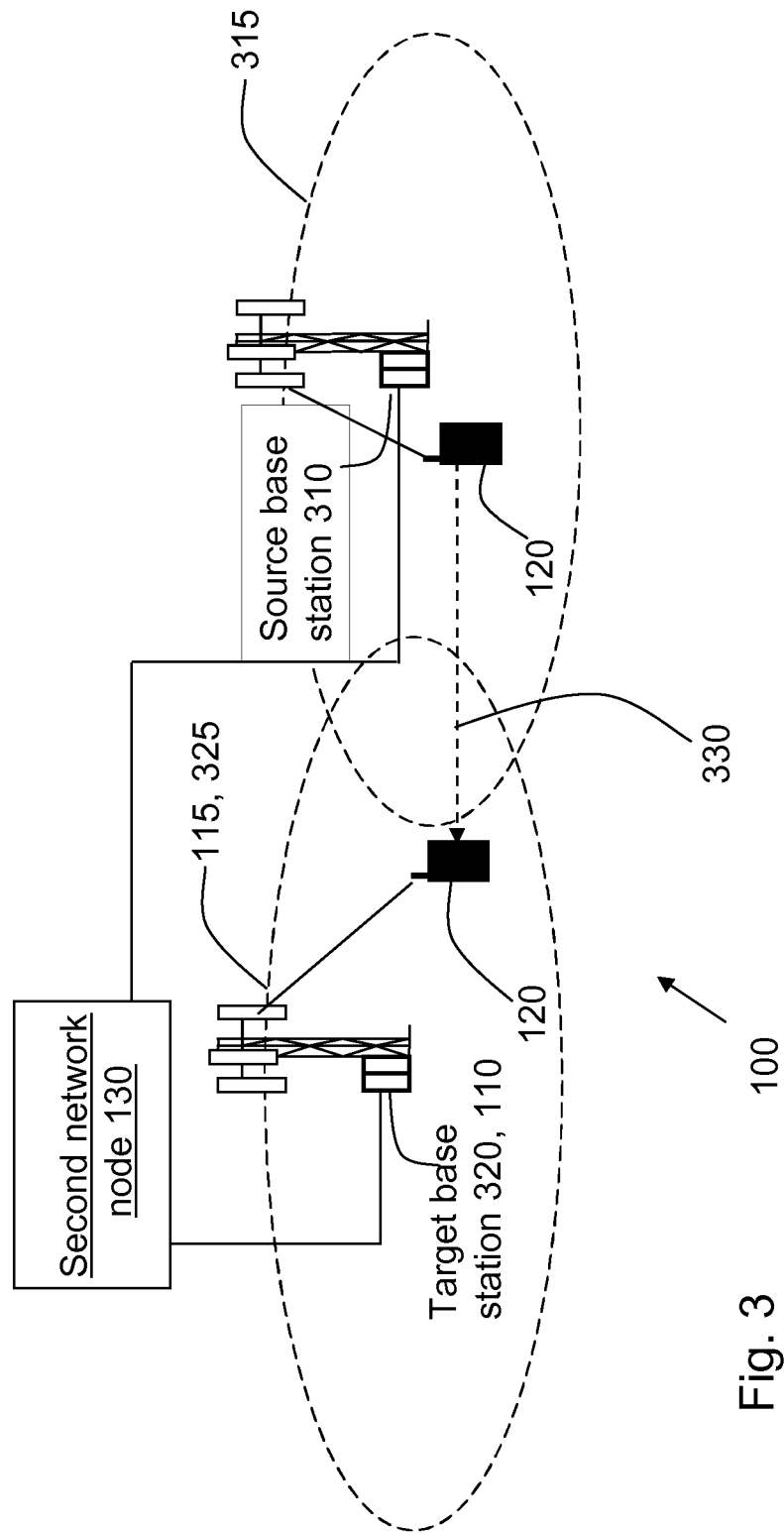
FIG. 3 is a schematic block diagram illustrating embodiments in a communications in a communications system.

In some embodiments, the user equipment 120 performs a handover from a source base station 310 to a target base station 320. In these embodiments, the first network node 110 is the target base station 320. This is illustrated in FIG. 3. The user equipment 120 is located in a source cell 315 served by the source base station 310. It moves from the source cell 315 to the cell 115, which in this figure is a target cell 325, served by the target base station 320. The movement of the user equipment 120 is illustrated by an arrow 330. When the signals from the source base 310 station becomes too weak due to increased distance to the source base station and the signals from the target base station 320 are stronger then the signals from the source base station 310 due to decreased distance to the target base station 320, the user equipment 120 performs the handover from the source base station 310 to the target base station 320.

In some embodiments, the first timer 410 or the second timer 420 is running when the user equipment 120 is served by the source base station 310.

In these embodiments, it is advantageous if the information of the first value received in Action 210 further comprises information about the remaining time until the first timer 410 expires. This may be because otherwise the first timer 410 may never expire, e.g. if the first timer 410 is set to a high value and the user equipment 120 makes frequent handovers. The remaining value of the second timer 420, if running at the event of a handover, should not be transferred to the target cell 325. Instead the GBR bearer should be released before the handover event.

Embodiments herein enable the second network node 130 such as the MME to apply different policies for different markets:

For embodiments for markets where pre-emption is allowed, the first timer 410 may be used to complement the "priority level" part of the Allocation and Retention Priority (ARP) IE. This for picking the best GBR bearer for pre-emption. Among pre-emptable GBR bearers on equal priority level, those bearers with the first timer 410 expired should be picked for pre-emption before those with the first timer 410 not started or running.

For embodiments for markets where pre-emption is not allowed, the priority level, if set for the GBR bearers, may be used together with the first timer 410 and the second timer 420, such as e.g. AT and HT. If the first timer 410 has expired for more than one established GBR bearer, the one with the lowest priority level should be picked for early release.

In some embodiments, the values for the first timer 410 and the second timer 420, such as e.g. AT and HT, may be set in line with the following: A high priority GBR bearer, like the one for an emergency call, shall not be possible to pre-empt and should have the first timer 410 such as AT equal to the second timer 420 such as HT, and set to the maximum value. A very low priority bearer should have a low value on AT, but not equal to zero though. A medium priority bearer should have a value somewhere in between these extremes.

To perform the method actions in the first network node 110 described above for handling a GBR bearer, the first network node 110 comprises the following arrangement depicted in FIG. 4. As mentioned above the first network node 110, 320 is comprised in a communications system 100. In some embodiments, the user equipment 120 is arranged to perform a handover from a source base station 310 to a target base station 320. In these embodiments the first network node 110, 320 is the target base station 320. The first network node 110 is therefore referred to as the first network node 110, 320.

The first network node 110, 320 comprises a first timer 410.

In some embodiments, the first network node 110, 320 further comprises the second timer 420.

The first network node 110, 320 further comprises an allocating unit 430 configured to allocate to the user equipment 120, a GBR bearer for a data transmission. The allocating unit 430 may be a control panel of the first network node 110.

The allocating unit 430 is further configured to release the GBR bearer when the first timer 410 has expired, when there is a request for a bearer from a second network node 130, and when there are no further bearer resources available within the first radio network node 110.

The first network node 110, 320 further comprises a timer control unit 440 configured to start a first timer 410, when scheduling of data for the data transmission on the GBR bearer is interrupted.

In some embodiments, the timer control unit 440 further is configured to start the second timer 420 when the first timer 410 expires.

The first timer 410 and the second timer 420 may be implemented per bearer.

The timer control unit 440 may further be configured to reset the first timer 410 and the second timer 420, and stop the second timer 420, when the data transmission is resumed after the interruption of scheduling data for the data transmission on the GBR bearer, while the second timer 420 is running.

The first network node 110, 320 according may further comprise a receiving unit 450 configured to receive a message from the second network node 110. The message comprises information of a first value of the first timer 410. The first value is the value when the first timer 410 expires. The message further comprises information of a second value of the second timer 420. The second value is the value when the second timer 420 expires.

In some embodiments, the information of the first value further comprises information about the remaining time until the first timer 410 expires.

The embodiments of the first network node 110 for handling a GBR bearer may be implemented through one or more processors, such as the processing unit 460 in the first network node depicted in FIG. 4, together with computer program code for performing the actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It is however feasible with other data carriers such as a memory stick. The computer program code may furthermore be provided as pure program code on a server and downloaded to the first network node 110, e.g. remotely.

The first network node 110 may further comprise a memory 470 comprising one or more memory units. The memory 350 is arranged to be used to store data such as information of the first value of the first timer 410 and information about the remaining time until the first timer 410 expires, information of the second value of the second timer 420, schedulings, and applications to perform the actions of the embodiments herein when being executed in the first network node 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, in a first network node, for handling a Guaranteed Bit Rate (GBR) bearer, the first network node comprised in a communications system, the method comprising:
   allocating a GBR bearer to a user equipment for a data transmission;
   starting a first timer in response to interruption of scheduling data for the data transmission on the GBR bearer;
   releasing the GBR bearer in response to all of the following conditions being satisfied:
      the first timer has expired;
      there is a request for a bearer from a second network node;
      there are no further bearer resources available within the first radio network node.

2. The method of claim 1:
   further comprising starting a second timer in response to the first timer expiring;
   both stopping the second timer and resetting the first and second timers in response to data transmission being resumed, while the second timer is running, after the interruption of scheduling data for the data transmission on the GBR bearer.

3. The method of claim 1, further comprising:
   receiving a message from the second network node;
   wherein the message comprises information about a first value of the first timer, the first value being a value of the first timer when the first timer expires;
   wherein the message comprises information about a second value of the second timer, the second value being a value of the second timer when the second timer expires.

4. The method of claim 3:
   wherein the first timer is running or wherein the second timer is running;
   wherein the information about the first value comprises information about remaining time until the first timer expires.

5. The method of claim 1:
   wherein the user equipment performs a handover from a source base station to a target base station;
   wherein the first network node is the target base station.

6. A first network node for handling a Guaranteed Bit Rate (GBR) bearer, the first network node comprised in a communications system, the first network node comprising:
   a first timer,
   an allocating circuit configured to allocate a GBR bearer to a user equipment for a data transmission;
   a timer control circuit configured to start a first timer in response to interruption of scheduling data for the data transmission on the GBR bearer;
   wherein the allocating circuit further is configured to release the GBR bearer in response to all of the following conditions being satisfied:
      the first timer has expired;
      there is a request for a bearer from a second network node;
      there are no further bearer resources available within the first radio network node.

7. The first network node of claim 6:
   further comprising a second timer;
   wherein the timer control circuit further is configured to:
      start the second timer in response to expiration of the first timer;
      both stop the second timer and reset the first and second timers in response to resumption, while the second timer is running, of data transmission after the interruption of scheduling data for the data transmission on the GBR bearer.

8. The first network node of claim 6:
   further comprising a receiving circuit configured to receive a message from the second network node
   wherein the message comprises information of a first value of the first timer, the first value being a value of the first timer when the first timer expires;
   wherein the message comprises information of a second value of the second timer, the second value being a value of the second timer when the second timer expires.

9. The first network node of claim 8, wherein the information of the first value comprises information about remaining time until the first timer expires.

10. The first network node of claim 6:
    wherein the user equipment is configured to perform a handover from a source base station to a target base station;
    wherein the first network node is the target base station.

* * * * *

UNITED STATES PATENT AND TRADEMARK OFFICE
CERTIFICATE OF CORRECTION

| | | |
|---|---|---|
| PATENT NO. | : 8,971,909 B2 | Page 1 of 1 |
| APPLICATION NO. | : 14/007108 | |
| DATED | : March 3, 2015 | |
| INVENTOR(S) | : Balck et al. | |

It is certified that error appears in the above-identified patent and that said Letters Patent is hereby corrected as shown below:

Specification

In Column 2, Line 1, delete "A GPR" and insert -- A GBR --, therefor.

In Column 4, Line 48, delete "node 110" and insert -- node 130 --, therefor.

In Column 5, Line 14, delete "node 120." and insert -- node 130. --, therefor.

Signed and Sealed this
Sixth Day of October, 2015

Michelle K. Lee
*Director of the United States Patent and Trademark Office*